United States Patent [19]

Fujioka et al.

[11] 4,371,066
[45] Feb. 1, 1983

[54] WET MULTIPLE DISC CLUTCH DEVICE FOR A VEHICLE TRANSMISSION

[75] Inventors: Kazuyoshi Fujioka, Tokyo; Mitsuo Ikkatai, Ome, both of Japan

[73] Assignee: Nissan Motor Company, Limited, Yokohama, Japan

[21] Appl. No.: 98,885

[22] Filed: Nov. 30, 1979

[30] Foreign Application Priority Data

Dec. 29, 1978 [JP] Japan .............................. 53-178873

[51] Int. Cl.³ .............................................. F16D 25/06
[52] U.S. Cl. ............................ 192/85 AA; 192/70.27
[58] Field of Search ................. 192/113 B, 20, 21, 51, 192/70.16, 70.2, 70.27, 87.17, 87.16, 109 A, 109 B, 109 F, 85 AA, 85 A

[56] References Cited

U.S. PATENT DOCUMENTS

| 1,340,885 | 5/1920 | Fuller ................................ 192/89 B |
| 2,100,464 | 11/1937 | Almen et al. ..................... 192/89 B |
| 2,979,176 | 4/1961 | Voth ................................. 192/87.17 |
| 3,054,491 | 9/1962 | Bloch et al. ...................... 192/87.17 |
| 3,099,166 | 7/1963 | Schou ............................... 192/87.17 |
| 3,266,608 | 8/1966 | Lemieux ........................... 192/89 B |
| 3,612,237 | 10/1971 | Honda .............................. 192/109 F |
| 4,134,483 | 1/1979 | Horsch ........................ 192/87.17 X |

FOREIGN PATENT DOCUMENTS 725571 3/1955 United Kingdom ........... 192/109 F

*Primary Examiner*—George H. Krizmanich
*Attorney, Agent, or Firm*—Thompson, Birch, Gauthier & Samuels

[57] ABSTRACT

A wet multiple disc clutch device for a vehicle transmission, comprising: a clutch drum functioning as a power input, the drum having a plurality of drive grooves formed on the inner surface of said clutch drum; a plurality of device plates each having a plurality of projections which engage with the drive grooves; a plurality of driven plates connected to the output shaft of the vehicle transmission and interleaved with the drive plates; a piston actuated by a hydraulic control pressure and adapted to press the drive and driven plates in contact; and a conical plate disposed between an endmost of the drive plates and the piston, having at least one projection formed on the outer circumference thereof the projection being engaged with the drive grooves on the clutch drum.

2 Claims, 11 Drawing Figures

FIG.6a
FIG.6b
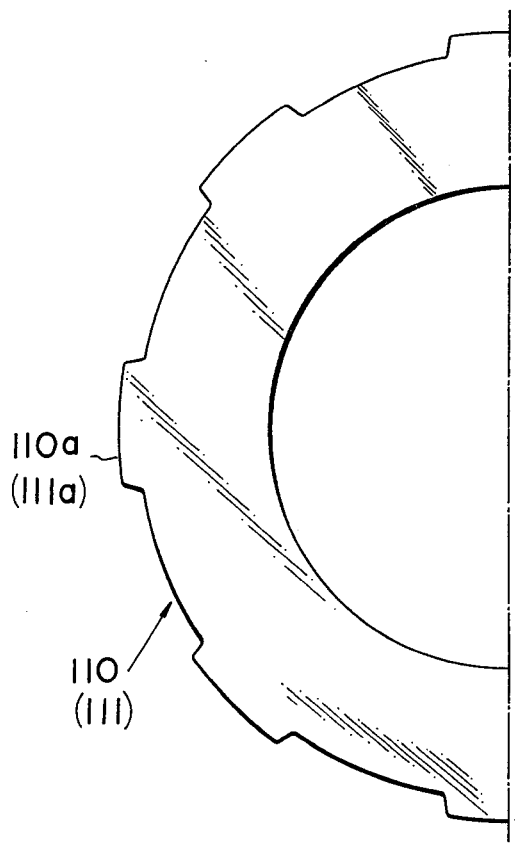
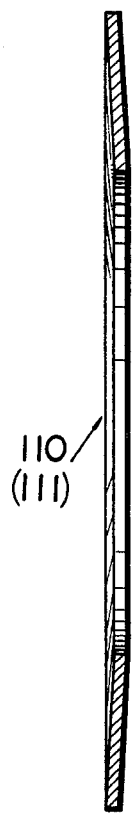

WET MULTIPLE DISC CLUTCH DEVICE FOR A VEHICLE TRANSMISSION

BACKGROUND OF THE INVENTION

This invention relates to a wet multiple disc clutch system in a transmission particularly adapted for mounting on an industrial or construction vehicle such as a forklift, shovel-loader or the like.

The clutch system of this type comprises a drive plate into which the engine power is fed, a driven plate connected to the output shaft and a piston which presses the two plates together and is operated hydraulically by a controlled oil pressure supply. In the absence of a cushioning mechanism, however, so-called "select shock" may take place, in which the vehicle starts abruptly at the moment of clutch engagement (i.e., the moment the clutch cylinder is filled with oil). That is, as oil is being supplies to the cylinder, there is a pressure difference between the pressure controller and the cylinder due to the resistance of the oil passage to the flow of oil. However, the moment the clutch cylinder becomes full the flow stops, and therefore the pressure difference disappears; thus the pressure in the cylinder rises abruptly and as a result the clutch fails to be engaged smoothly. This select shock may be relatively slight with heavy-weight or loaded vehicles, but with unloaded or light class vehicle weighing less than a ton, the shock is strong because the latter can start with a low torque. The pressure relationship can be written:

$$Pm = Pc + pa,$$

where Pm is the supply pressure at the pressure controller, Pc is the pressure in the clutch cylinder and Pa is the pressure drop caused by the resistance in the passage from the pressure controller to the clutch. Pm is never less than Pc, but Pc equals Pm abruptly at the moment of clutch engagement (the moment the clutch cylinder is filled with oil and the flow in the passage stops). Consequently, as long as Pa is greater than zero, the abrupt rise of Pc (the pressure in the clutch cylinder) at the instant t1, at which the clutch cylinder is filled with oil cannot be substantially avoided, as shown in FIG. 7(b). A shock torque, therefore, is produced as shown in FIG. 7(a), and the value "a" off peak torque also is high. This problem can be solved if Pa is made zero, that is, the pressure drop is eliminated. For this, however, the distance between the modulator valve and the clutch must be minimized, and the oil passage therebetween must be diametrically enlarged. Furthermore, the passage would need to have no sharp bends or joints which offer resistance. In practice, such a design is extremely difficult to implement due to the limitations of the transmission layout and the size requirement or manufacturing conditions.

It has been proposed to form the steel drive plate 24 in a conical shape as illustrated in FIG. 1, to obtain a cushioning action from the plate itself, but in that case the facing of the driven plate 22 angularly collides with the steel drive plate 24, temporatily creating abnormally high pressures on the facing surface. This could induce burning or abnormal wear, particularly with the recently appearing paper facing of driven plate 22 (graphite-containing paper or the like), and hence the conical steel drive plate 24 is regarded as impractical. There has been another proposal in which the conical plate 28a is seated on a stepped retainer plate 28 as shown in FIG. 2. This also has the drawback in that, when the clutch facing 22 wears away, the space between the clutches is enlarged also due to the fatigue of the conical plate 28a, to catch the conical plate 28a which has come out of the stepped portion of the retainer plate 28, failing to achieve the intended effect. Furthermore, in the design, a steel drive plate must be additionally inserted between the conical plate 28a and the driven plate 22 to prevent the wear of the latter, which increases production costs.

As a solution to the above problem, it has been proposed to insert a conical plate 110 between the drive plate 24 and piston 14 as shown in FIG. 3. However, in the proposed design the conical plate 110 rotates freely and due to its vibration, wears away the engaging groove 13b of clutch drum 13. The conical plate 110 is also apt to be caught by the worn out portion which hampers the proper clutch action. Particularly, with a forklift, shifting between the forward and reverse gears is frequent and hence, the wear caused by the oscillation of the conical plate is very appreciable, and noise is often caused.

SUMMARY OF THE INVENTION

Therefore, it is an object of the present invention to provide a wet multiple disc clutch device for a vehicle transmission which gives excellent clutch action and prevents occurrence of shock torque at the time of clutch engagement.

According to the present invention, there is provided a wet multiple disc clutch device for a transmission wherein a projection (or preferably a plurality of projections) is formed on the exterior surface of a conical plate which is positioned between a clutch and a piston for actuating the clutch. The conical plate projection fits into the groove formed on the clutch drum allowing the conical plate to rotate integrally with the clutch drum.

BRIEF DESCRIPTION OF THE DRAWINGS

This and other objects, features and advantages of the present invention will become more apparent from the following description of the preferred embodiment of the present invention taken in conjunction with the accompanying drawings in which:

FIG. 6(a) is a front view showing half of an embodiment of the conical plate to be employed according to the invention;

FIG. 6(b) is a cross-sectional view of the same embodiment;

DESCRIPTION OF THE PREFERRED EMBODIMENT

Figure 4:
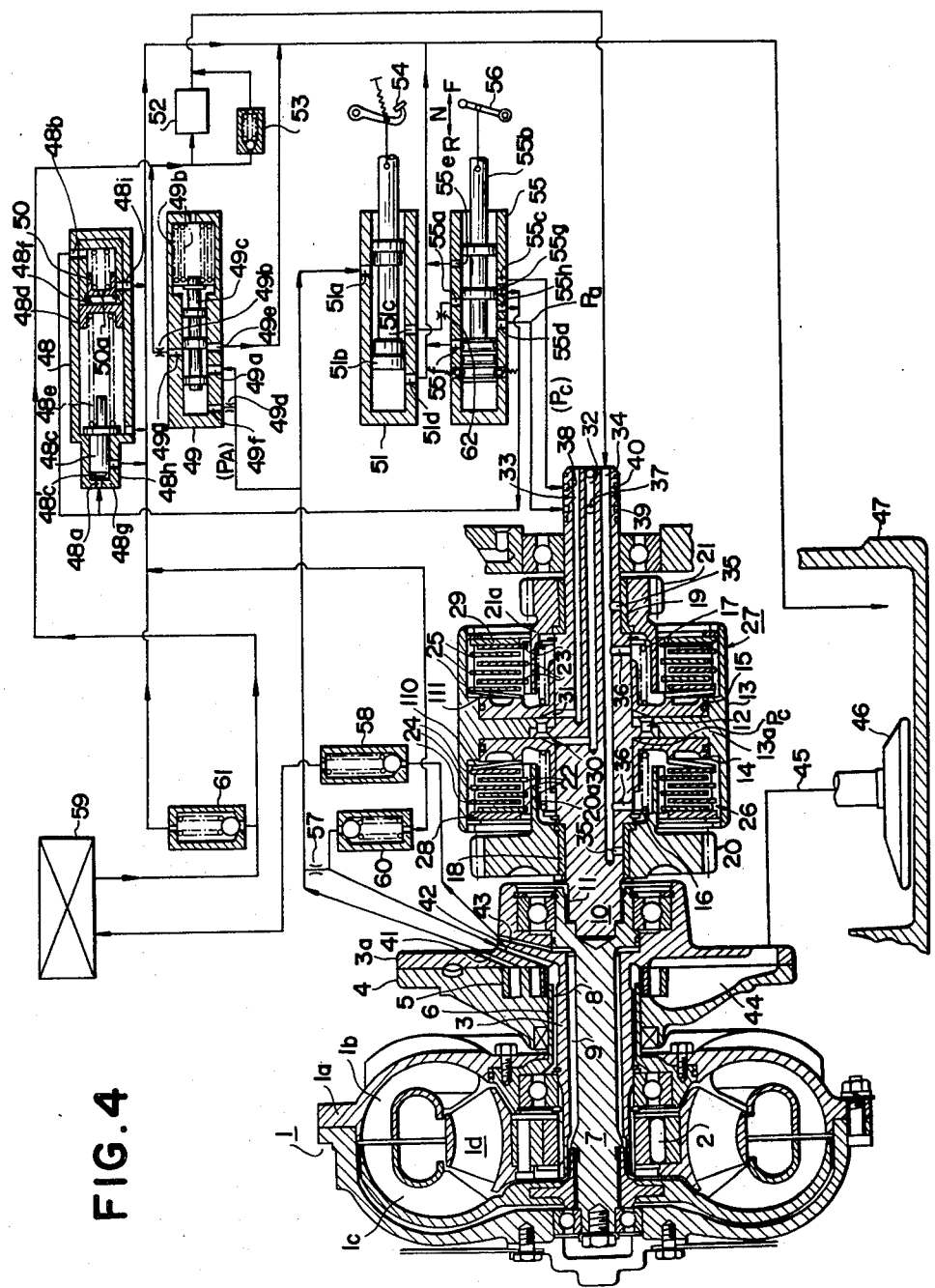
FIG. 4 is a schematic cross-sectional view showing one embodiment of the wet multiple disc clutch system according to the present invention.

Referring now to FIG. 4, there is shown an automobile transmission including a wet multiple clutch device according to the present invention.

The housing 1a of the torque converter 1 is connected to the output shaft of the engine (not shown) and rotates integrally therewith. A pump impeller 1b is fixed on the housing 1a with which it rotates as driven by the engine power, and continuously feeds hydraulic oil under a predetermined pressure in the torque converter 1 into turbine 1c and stator 1d of the torque converter 1, in that order. The hydraulic oil is then returned to the pump impeller 1b. This oil flow rotates turbine 1c with torque conversion under the reaction of stator 1d, because the stator 1d is fixed to a fixed hollow shaft 3 through a one-way clutch 2.

The flanged portion 3a of the fixed hollow shaft 3 is joined to a pump cover 4, and between the two a gear pump 5 is provided as the oil pump. The gear pump 5 is of the ordinary type composed of an outer gear provided with internal teeth and an inner gear engaging therewith, which is driven by the engine power transmitted through the hollow pump drive shaft 6 connected to the housing 1a of the torque converter to the inner gear.

The turbine 1c is splined to the torque converter output shaft 7 to provide annular oil passages 8 and 9 in the space between the fixed hollow shaft 3 and pump drive shaft 6 and therein, between the shaft 3 and the torque converter output shaft 7, respectively. An oil passage 8 supplies hydraulic oil to the torque converter 1, and an other passage 9 returns oil from the converter 1.

A clutch input shaft 10 is provided behind the torque converter output shaft 7 coaxially therewith, so that the two can be integrally rotated by spline 11. On the clutch input shaft 10, furthermore, a clutch drum 13 is coaxially fixed by means of a rivet 12, the inside of the drum 13 being divided in two in the axial direction by a partition 13a. In the drum chambers thus formed pistons 14 and 15 are fitted and are pressed toward the partition 13 by springs 16 and 17, respectively. A drive gear 20 for forward motion and another drive gear 21 for reverse motion are rotatably mounted on the clutch input shaft 10 through bushes 18 and 19, respectively, the gears 20 and 21 having cylindrical portions 20a and 21a extending into the clutch drum 13, respectively. Driven plates 22 and 23 are splined to the external surfaces of the cylindrical portions 20a and 21a, respectively. Drive plates 24 and 25 are engaged with grooves 13b on the inner surface of clutch drum 13 by the projections on the plates. The driven plates 22 and drive plates 24 are positioned alternately to form a clutch 26 for the forward position, and the driven plates 23 and drive plates 25 are disposed alternately to form a clutch 27 for the reverse position. Incidentally, in this particular embodiment the facings of driven plates 22 and 23 are made of a sintered alloy, while those of drive plates 24 and 25 are made of steel.

Figure 1:
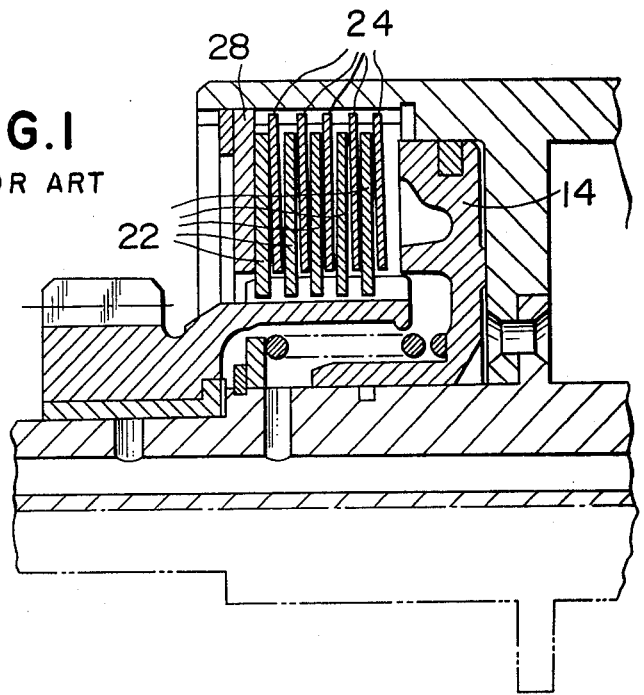
FIG. 1 is a cross-sectional view of a conventional wet multiple disc clutch system.
Figure 2:
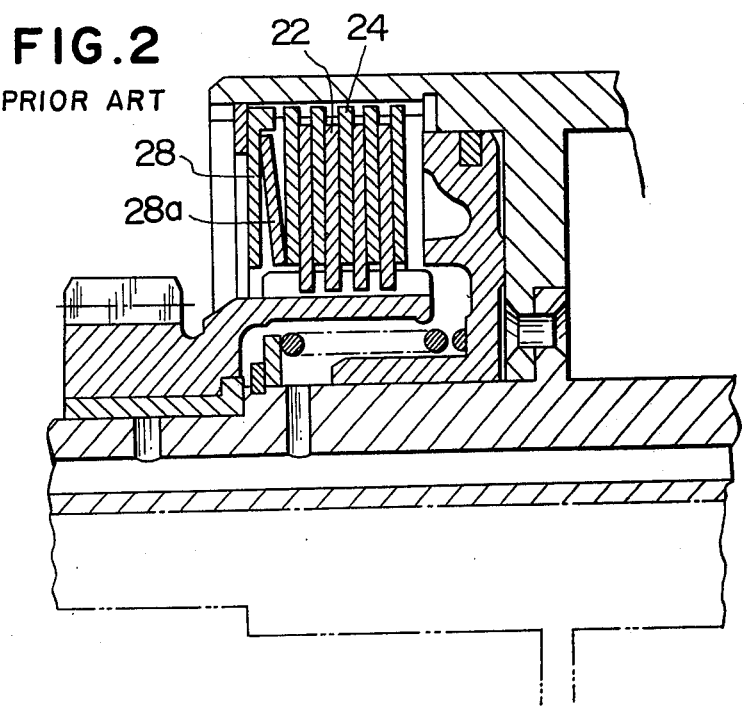
FIG. 2 is a cross-sectional view of another conventional wet multiple disc clutch system.
Figure 3:
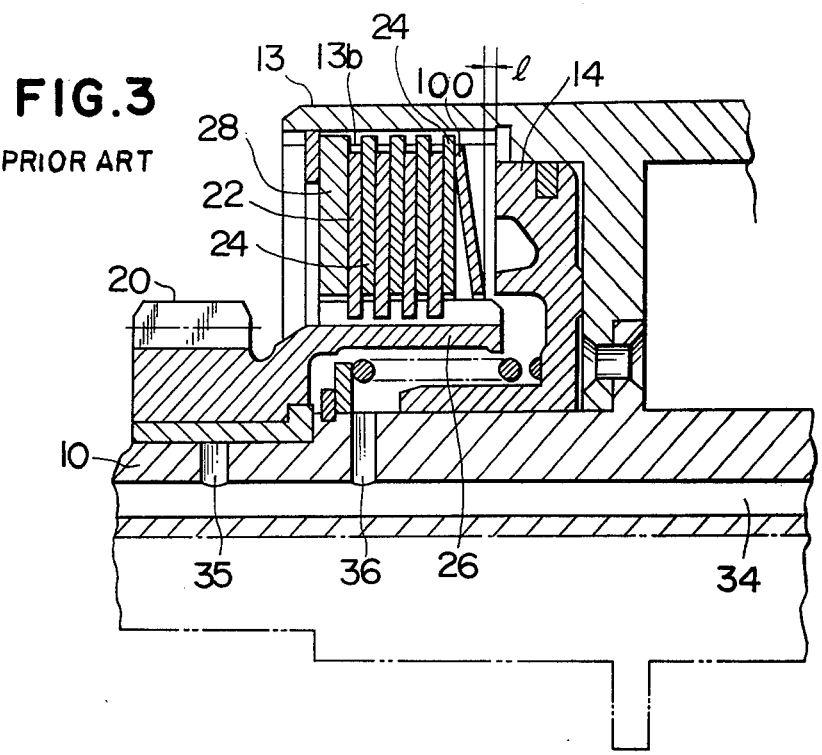
FIG. 3 is a cross-sectional view of still another conventional wet multiple disc clutch system.
Figure 5:
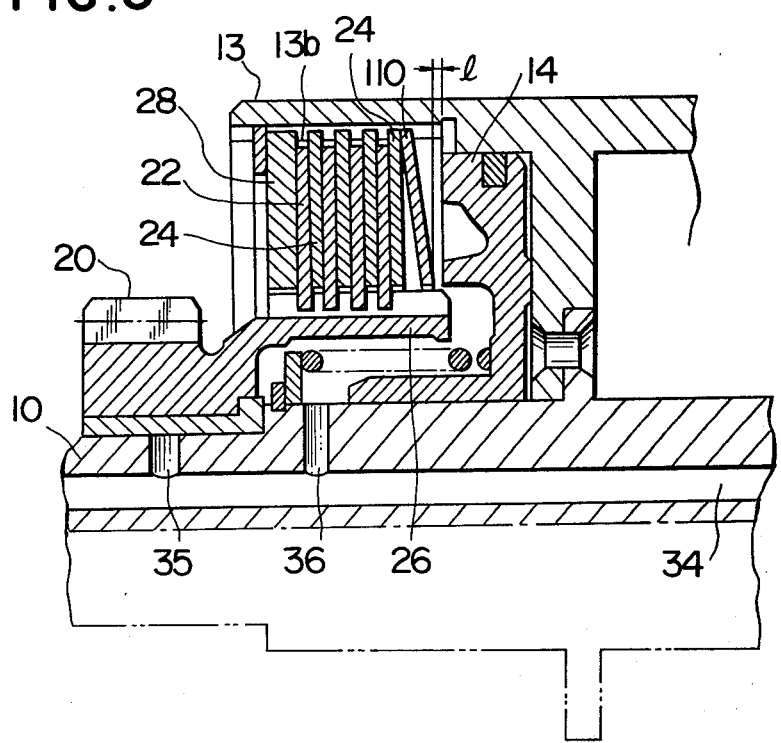
FIG. 5 is a cross-sectional view showing in detail the disposition of the conical plates according to the invention.

As shown in detail in FIG. 5, the conical plates 110 and 111 of this invention are mounted on the forward and reverse clutches 26 and 27, respectively. More particularly, the conical plate 110 is positioned between the piston 14 and drive plate 24 by engaging the projections 110a of the plate 110 with the grooves 13b on the inner surface of the clutch drum 13. The conical plate 110 is movable in the axial direction of the clutch drum 13 and integrally rotatable therewith. When clutch 13 is disengaged, the exterior periphery of the plate 110 contacts that of the driven plate 24, the plate 110 being spaced from piston 14 by the distance 1. By such an arrangement, any drag between driven plates 22 and 23 and drive plates 24 and 25, which may be caused by the presence of an oil film when the clutch is disengaged, is prevented by the conical plates 110 and 111 as will be more fully described later. Furthermore, when the clutch 13 is engaged, the driven plates 22 or 23 contact drive plates 24 or 25 in accordance with the movement of pistons 14 or 15, respectively, the conical plates 110 and 111 functioning as a cushion to effect gradual synchronization of the two plates. Specific examples of the conical plate 110 and 111 are shown in FIG. 6, (a) and (b).

Referring again to FIG. 4, receivers 28 and 29, for the reaction of pistons 14 and 15 respectively, are fixed on the two inner end surfaces of clutch drum 13.

In the spaces between the partition 13a and pistons 14 and 15, oil pressure chambers 30 and 31 are formed, respectively, into which the oil passages 32 and 33 provided in the clutch input shaft 10 are opened. The shaft 10 is provided with still another oil path 34 for clutch lubrication, from which are branched the ports 35 and 36 opening into bushings 18 and 19 and clutches 26 and 27. The oil passages 32 and 33 are connected to grooves 39 and 40 formed on the exterior surface of the shaft 10, through the ports 37 and 38, respectively, while the oil passage 34 is opened to the end plane of the same shaft.

Three ports 41, 42, 43, each leading to the discharge side of pump 5, and oil paths 8 and 9, respectively, are provided on the flange 3a the fixed hollow shaft 3. Into the suction side of pump 5, a path 44, formed between the flange 3a fixed hollow shaft 3 and the pump cover 4, is opened, the path being connected to a suction pipe 45 having an oil filter 46 provided at the end thereof. This oil filter 46 is immersed in the hydraulic oil stored in the oil tank 47 (at the lower portion of the transmission case).

The oil pressure created by the oil pump 5 is fed to port 49f of pressure control valve 49, either directly from port 41 or through orifice 49d, as well as to the port 51a of stop valve 51. The pressure control valve 49 has a spool 49c urged leftward, as shown in the drawing, by a spring 49b, which operates in response to the balance between the oil under pressure supplied by the pump 5 and applied to the left of the spool 49c through orifice 49d and port 49f, and the force of the spring 49b. As soon as the spool 49c, so actuated, opens drain port 49e, excessive pressure of the oil fed to the stop valve 51 is released to maintain the line pressure of the stop valve 51 constant. A second drain port 49g, which opens slightly earlier than the drain port 49e, is provided on the pressure control valve 49, the hydraulic oil discharged from the port 49g being filtered through an oil filter 52 and sent to the path 34 as clutch lubricating oil. If the oil filter 52 is clogged, a vent 53 opens to prevent any damage to the circuit beyond the valve 49.

The stop valve 51 is provided with a piston 51b connected to a brake pedal 54. When the brake pedal is depressed, the piston 51b closes port 51a to stop the incoming oil flow under pressure, as well as to connect port 51c opening into the entrance port 55a of select valve 55 provided with drain port 51d. It is desirable to provide an constricting orifice 62 between the port 51c of stop valve 51 and the entrance port 55a of the select valve 55.

The select valve 55 has a piston 55b which is linked with a change lever 56 manually operated by the driver, and which closes port 55a and simultaneously communicates with ports 55c and 55d with drain ports 55e and 55f, respectively, when the lever 56 is in the neutral (N) position. Whereas, if the lever 56 is shifted to the forward (F) positon, the spool 55b connects the port 55a to port 55d, and port 55d with the drain port 55e. Furthermore, when the lever 56 is shifted to reverse (R) position, port 55a communicates with port 55e, and port 55d with the drain port 55f. The ports 55c and 55d communicates wit oil paths 33 and 32, respectively, through grooves 40, 39 and ports 38 and 37, respectively.

The select valve 55 is further provided with two ports 55g and 55h which open to points near the two ends of the central land of piston 55b closing the entrance ports 55a at the neutral positon 55b, and are connected in common to the ports 48a and 48b of the modulator valve 48. This modultor valve 48 includes a small-diameter pressure control piston 48c and a large-diameter pressure increase piston 48d, the two pistons being urged apart by a spring 48e. In the end portion of modulator valve 48, in proximity to the pressure increase piston 48d, a check valve 50 is seated. The port 48b is connected to the oil pressure chamber 48f through the connecting orifice 50a provided on the check valve 50, and the port 48a and drain port 48h are opened to the oil pressure chamber 48g of the pressure control piston 48c. It should be understood that the taper 48c' formed on the forward end of the pressure control piston 48c is for moderating the opening and closing actions of the drain port 48h. Also, a drain port 48a for allowing the oil under pressure in the oil pressure chamber to flow out when the check valve 50 is opened by the pressure rise within the oil pressure chamber 48f, is provided on the modulator valve 48.

A portion of the hydraulic oil discharged from the pump 5 is caused to flow into the torque converter 1 through orifice 57 and oil paths 42 and 8. This oil is fed to the pressure maintenance valve 58 through the oil paths 9 and 43, and further therefrom to the oil filter 52 through the oil cooler 59 which is provided, for example, in a lower radiator tank. The pressure maintenance valve 58 maintains the pressure inside the torque converter 1 at normal pressure level. Even if the oil path leading to the oil cooler 59 is clogged so that the pressure in the torque converter 1 rises abnormally, the vent valve 60 operates to vent the oil pressure, whereby preventing breakdown of torque converter 1. The vent valve 61 is provided for an identical purpose, functioning as a double safety mechanism to prevent breakdown of the torque converter 1. The valve also contributes to prevent breakdown of the oil cooler 59.

The action of the above-described multiple disc clutch system will now be explained.

In the state wherein the change lever 56 is in the F (forward) position as illustrated, the select valve 55 connects the ports 55a and 55d, through which the oil under pressure is supplied to the oil pressure chamber 30, via the groove 39, port 37 and oil path 32, to push the piston 14 leftward to actuate the clutch 26. At the same time, the clutch input shaft 10 corotating with the torque converter output shaft 7, rotates the gear 20 through the clutch 26. The power is transmitted to the driving wheels of the vehicle through the gear train (not shown) including the gear 20, allowing forward movement of the vehicle.

When the change lever is in the R (reverse) position, the select valve 55 connects the ports 55a and 55c, through which the oil under pressure is supplied to the oil pressure chamber 31, via the groove 40, port 38 and oil path 33, to push to piston 15 rightward and consequntly, to actuate the reverse clutch 27. Whereupon, the clutch input shaft 10 co-rotating with the torque converter output shaft 7 rotates the gear 21 through the clutch 27. Power is thus transmitted to the driving wheels of the vehicle through the gear train (not shown) including the gear 21, to run the vehicle in the reverse direction.

During both forward and reverse motions, the oil pressure for clutch operation acts on both the pressure control piston 48c and pressure increase piston 48d of the modulator valve 48, from the ports 55h or 55g of the select valve 55. Due to the difference in the pressure-receiving area of the two piston, the pressure increase piston 48d forcibly presses the pressure control piston 48c to the leftmost position through a spring 48e, to cut off the connection of ports 48a and 48h. The oil pressure for clutch connection, which is supplied from the ports 55c and 55d of the select vlave 55, is therefore maintained at a high level to ensure that the clutch is engaged continuously. Furthermore, because the partial pressure in the path leading from the oil pump 5, via the stop valve 51, to select valve 55, is also maintained at a high valve, a satisfactory amount of hydraulic oil branches from the above path and flows into the torque converter 1; that is, the oil subsequently supplied to the oil path 34 from the torque converter, via the pressure-maintaining valve 58, oil cooler 59 and oil filter 52, can be guaranteed. A satisfactory amount of hydraulic oil then flows from the oil path 34 to the bush 18 and 19 via port 35 and further to the space between the drive plates and driven plates of clutch 26 and 27, via port 36, for lubrication.

When the change lever 56 is in the N (neutral) position, the piston 55b of select valve 55 closes the port 55a. Simultaneously, the ports 55c and 55d are connected to the drain port 55e and 55f, respectively. Consequently, both clutches 26 and 27 are released and the rotation of clutch input shaft 10 is not transmitted to either of the gears 20 and 21, leaving the vehicle at a standstill. Since the port 55a of the select valve 55 is closed as aforesaid, the oil pressure in the conduit leading from the pump 5 to the stop valve 51 is maintained at a high level and clutch lubrication is effected similarly as in the preceding case.

According to the present invention, the conical plates 110 and 111 are located between the piston 14 and drive plate 24, with their projections 110a and 111a fitted into the engaging grooves 13b on the clutch drum 13, so that they rotate integrally with the drum 13. Hence, vibration of conical plates 110 and 111 never takes place and excellent clutch action can be obtained without noise or abrasion of the grooves 13b. As a result, the resilient action of the conical plates 110 and 111 enables a substantially smooth rise of the oil pressure in the clutch piston chamber, inhibiting occurrence of any shock torque. Thus, the so called "select shock" can be prevented.

Figure 7A:
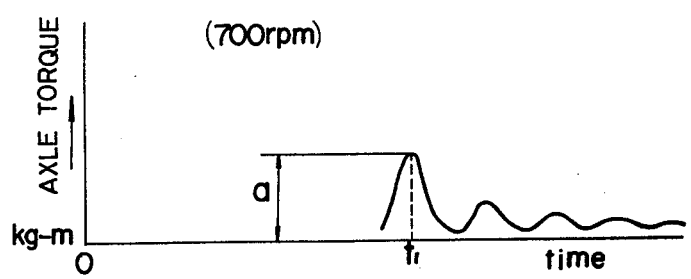
FIGS. 7(a) and (b) are graphs showing the changes in time of axle torque and oil pressure respectively, in the conventional wet multiple disc clutch system, and FIGS. 8(a) and (b) are graphs showing similar characteristics, in the wet multiple disc clutch system of the present invention.
Figure 7B:
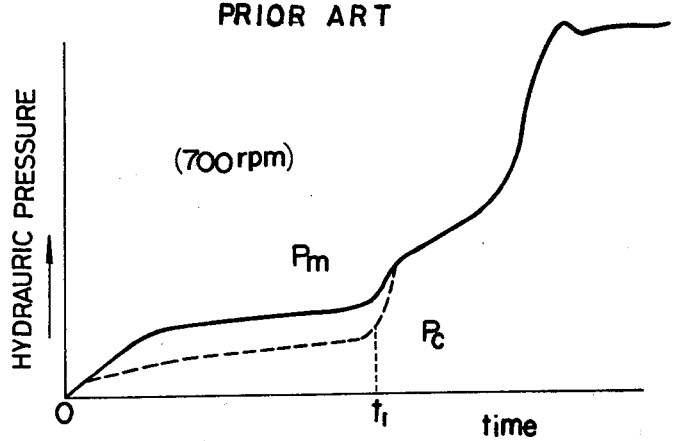
Figure 8A:
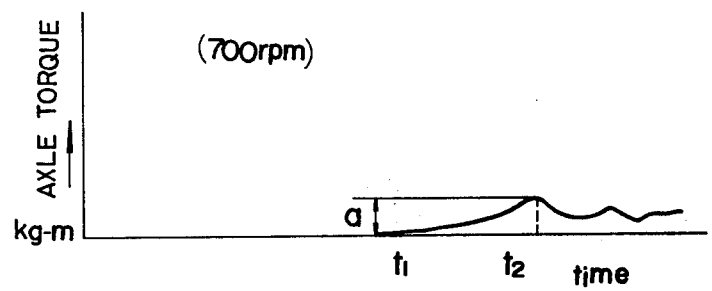
Figure 8B:
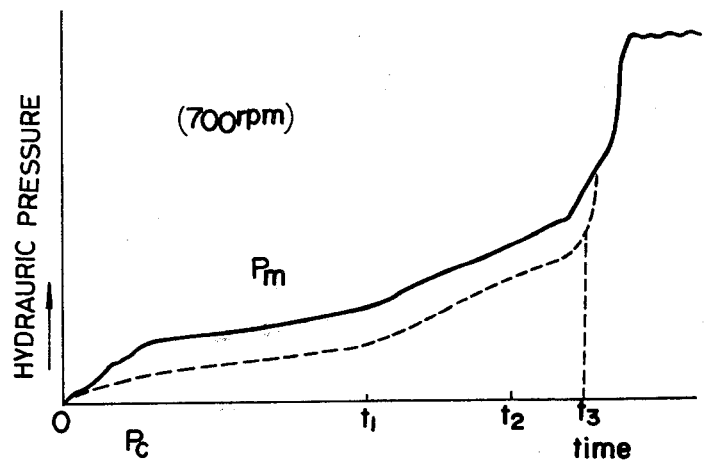

That is, as illustrated in FIG. 8(B), after passage of a predetermined time length t1, the drive plate 24 or 25 starts to contact driven plate 22 or 23, but the oil pressure Pc in the clutch chamber does not rise abruptly, but rather increases progressively. Furthermore, piston 14 or 15 applies pressure to contact the drive plate 24 or 25 and driven plate 22 or 23 through the conical plate 110 or 111, so that at time t2 the rotation of the two plates synchronizes and at time t3 the conical plate 110 or 111 comes fully in contact with the drive plate 24 or 25. Whereupon the oil pressure in the clutch chamber rises rapidly. Consequently, as to the axle torque characteristics, again the axle torque increases with a smooth curve as shown in FIG. 8(a) and the maximum value "a" of the peak torque ia markedly reduced, compared with the maximum value "a" of the peak torque shown in FIG. 7(a).

The present invention provides the conical plate integrally rotating with the clutch drum with their projections fitted with the grooves in the clutch drum, in the space between the pistons and drive plates. By the proposed mechanism, noise or undesirable catching of the conical plates can be effectively prevented and excellent clutch action can be constantly ensured, avoiding occurrence of any shock troque.

What is claimed is:

1. A wet multiple disc clutch device for a vehicle transmission, having an input shaft and an output shaft, comprising:
   a clutch drum having a plurality of drive grooves formed on the inner surface thereof;
   a plurality of plane drive plates each having a plurality of projections which engage with said drive grooves;
   a plurality of plane driven plates connected to the output shaft of the vehicle transmission and interleaved with the plane drive plates to that the plane drive plates and the plane drive plates are alternately disposed to form a clutch;
   a piston actuated by hydraulic control pressure and adapted to press the plane drive and plane driven plates into contact with each other; and
   a conical plate disposed between an endmost one of said plane drive plates and said piston, said conical plate having at least one projection formed on the outer circumference thereof, said projection being engaged with said drive grooves on said clutch drum, said piston being spaced axially from the inner portion of said conical plate when said clutch is disengaged and being arranged to contact said inner portion upon engagement of said clutch, thereby causing the outer portion of said conical plate to contact said endmost drive plate.

2. A wet multiple disc clutch device for a vehicle transmision, comprising:
   a clutch input shaft;
   a clutch drum, coaxially fixed on said clutch input shaft, with first and second sets of grooves formed on the inner surface thereof;
   a partition dividing the inside of said clutch drum axially into two chambers so that one chamber includes the first set of grooves, and the other chamber includes the second set of grooves;
   a first piston positioned in said first chamber;
   a second piston positioned in said second chamber;
   a first means for biasing said first piston toward said partition;
   second means for biasing said second piston toward said partition;
   a forward drive gear rotatably mounted on said clutch input shaft;
   a reverse drive gear rotatably mounted on said clutch input shaft;
   a forward clutch having plane drive and plane driven plates alternately arranged in said first chamber for selectively transmitting power from said forward motion drive gear to said clutch drum, said forward clutch being actuated by said first piston against the force of said first biasing means;
   a reverse clutch having plane drive and plane driven plates alternately arranged in said second chamber for selectively transmitting power from said reverse motion drive gear to said clutch drum, said reverse clutch being actuated by said second piston against the force of said second biasing means;
   a first conical plate provided between said first piston and said forward clutch and having projections formed around the circumference thereof which engage with said first set of grooves of said clutch drum, said first conical plate being movable in the axial direction of said clutch drum and being integrally rotatable therewith, the inner edge of said first conical plate being spaced axially from said first piston when said forward clutch is disengaged, and upon engagement of said forward clutch, the inner edge of said first conical plate being adapted to contact said first piston, and the outer edge of said first conical plate being adapted to contact an endmost one of said drive plates of said forward clutch; and
   a second conical plate provided between said second piston and said reverse clutch and having projections formed around the circumference thereof which engage with said second set of grooves of said clutch drum, said second conical plate being movable in the axial direction of said clutch drum and being integrally rotatable therewith, the inner edge of said second conical plate being spaced axially from said second piston when said reverse clutch is disengaged, and upon engagement of said reverse clutch, the inner edge of said second conical plate being adapted to contact said second piston, and the outer edge of said second conical plate being adapted to contact an endmost one of said drive plates of said reverse clutch.

* * * * *

UNITED STATES PATENT AND TRADEMARK OFFICE
CERTIFICATE OF CORRECTION

PATENT NO. : 4,371,066
DATED : February 1, 1983
INVENTOR(S) : K. Fujioka et al

It is certified that error appears in the above-identified patent and that said Letters Patent are hereby corrected as shown below:

IN THE CLAIMS

Claim 1, Column 7, line 36, delete "drive" (second occurrence) and insert --driven--.

Signed and Sealed this

Twelfth Day of April 1983

[SEAL]

Attest:

GERALD J. MOSSINGHOFF

Attesting Officer    Commissioner of Patents and Trademarks